(12) United States Patent
Hischier et al.

(10) Patent No.: US 9,869,302 B2
(45) Date of Patent: Jan. 16, 2018

(54) SOLAR RECEIVER

(75) Inventors: Illias Hischier, Zurich (CH); Aldo Steinfeld, Brugg (CH); Marco Simiano, Zurich (CH)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 13/908,427

(22) PCT Filed: Nov. 25, 2011

(86) PCT No.: PCT/EP2011/071065
§ 371 (c)(1),
(2), (4) Date: Sep. 19, 2017

(87) PCT Pub. No.: WO2012/076347
PCT Pub. Date: Jun. 14, 2012

(65) Prior Publication Data
US 2013/0255255 A1    Oct. 3, 2013

(30) Foreign Application Priority Data
Dec. 6, 2010   (GB) .................................. 1020625.8

(51) Int. Cl.
*F03G 6/04* (2006.01)
*F24J 2/07* (2006.01)
(Continued)

(52) U.S. Cl.
CPC .............. *F03G 6/04* (2013.01); *F03G 6/065* (2013.01); *F24J 2/0488* (2013.01); *F24J 2/07* (2013.01);
(Continued)

(58) Field of Classification Search
CPC ...... F24J 2/0488; F24J 2/07; F24J 2/04; F24J 3/02; F03G 6/04
See application file for complete search history.

(56) References Cited

U.S. PATENT DOCUMENTS 3,421,781 A * 1/1969 Spurk .................. F15D 1/04
138/39
4,263,895 A * 4/1981 Colao .................. F24J 2/07
126/586

(Continued)

FOREIGN PATENT DOCUMENTS

CN       1161741 A     10/1997
CN     101307956 A  * 11/2008
(Continued)

OTHER PUBLICATIONS

Great Britain Search Report for Application No. GB1020625.8, dated Apr. 6, 2011, 3 pages.
(Continued)

*Primary Examiner* — Mark A Laurenzi
*Assistant Examiner* — Shafiq Mian
(74) *Attorney, Agent, or Firm* — Dority & Manning, P.A.

(57) ABSTRACT

A solar receiver (100) having a radiation capturing element (3) about which is formed a channel (8) through which a working fluid flows such that thermal energy of the radiation capturing element (8) is absorbed by the working fluid, the channel (8) being shaped to provide a uniform cross sectional area along a length thereof between an inlet thereto and an outlet therefrom.

11 Claims, 5 Drawing Sheets

(51) Int. Cl.

| | | |
|---|---|---|
| *F24J 2/28* | (2006.01) | |
| *F24J 2/46* | (2006.01) | |
| *F24J 2/48* | (2006.01) | |
| *F03G 6/06* | (2006.01) | |
| *F24J 2/04* | (2006.01) | |
| *F24J 2/16* | (2006.01) | |

(52) U.S. Cl.
CPC .............. *F24J 2/28* (2013.01); *F24J 2/465* (2013.01); *F24J 2/4625* (2013.01); *F24J 2/484* (2013.01); *F24J 2/16* (2013.01); *Y02E 10/41* (2013.01); *Y02E 10/44* (2013.01); *Y02E 10/46* (2013.01)

(56) References Cited

U.S. PATENT DOCUMENTS

| 5,709,456 A | 1/1998 | Smith et al. |
|---|---|---|
| 5,931,158 A | 8/1999 | Buck |
| 2002/0083946 A1 | 7/2002 | Karni et al. |
| 2009/0241938 A1* | 10/2009 | Arbogast et al. ............. 126/643 |
| 2011/0283700 A1* | 11/2011 | Zohar et al. ............... 60/641.15 |

FOREIGN PATENT DOCUMENTS

| DE | 4011233 A1 * | 10/1991 | ............ F02G 1/055 |
|---|---|---|---|
| EP | 1610073 A2 | 6/2005 | |
| EP | 179318 A1 | 6/2007 | |
| JP | H01-190274 A | 7/1989 | |
| WO | WO 0161254 A1 * | 8/2001 | |
| WO | 2008081209 A2 | 7/2008 | |
| WO | 2009121030 A2 | 10/2009 | |
| WO | 2010074715 A1 | 7/2010 | |
| WO | WO 2010082206 A1 * | 7/2010 | |

OTHER PUBLICATIONS

International Search Report and Written Opinion of the International Searching Aurhtority, for Application PCT/2011/071065, dated Mar. 21, 2013, 15 pages.

* cited by examiner

SOLAR RECEIVER

This is a US National Phase application of International Application No. PCT/EP2011/071065 having an International Filing Date of Nov. 25, 2011, which claims priority to GB 1020625.8, filed on Dec. 6, 2010, each of which is incorporated herein in its entirety by reference.

TECHNICAL FIELD

The present disclosure relates to solar receivers for capturing solar radiation and converting it into thermal energy of a working fluid, and in particular to geometrical optimisation of a flow channel in the solar receiver to reduce pressure losses in the working fluid.

BACKGROUND ART

The field of power generation systems using renewable energy sources comprises the conversion of energy from the sun's radiation into useful work that can then be used to generate power such as electricity. One means by which this conversion might be achieved is through that of solar heating of a working fluid such as a liquid or a gas, which fluid once heated may then be used to drive some form of turbine to generate electrical power. Systems that operate on this principle may employ large arrays of parabolic mirrors arranged in a precise manner around a solar receiver to reflect radiation from the sun on to a particular area of the solar receiver. In this manner a system is arrived at that allows a far larger amount of the sun's radiation to be directed to the solar receiver than would otherwise be practicable through enlargement of the solar receiver or some form of concentrating lens. The key factors surrounding the solar receivers are those of: efficiency of conversion between the energy of the sun's radiation and the useful work generated; cooling issues involving ensuring that the solar receiver is capable of withstanding the high temperatures that it is subjected to under focussed solar radiation; and mechanical robustness of the system in the face of operating environments, such as deserts, which often pose such issues as dust storms and ranges of temperature.

Two forms of solar receiver are direct solar receivers and indirect solar receivers. Direct solar receivers allow the solar radiation to directly pass through a window to a working fluid, which working fluid is conveniently a gas such as air. In this instance the solar radiation acts directly upon the working fluid and causes a consequent rise in thermal energy. In an indirect solar receiver system, the solar radiation is interrupted from reaching the working fluid directly by a material of some kind such as a solid surface, typically metallic, and it is this solid surface that is heated by the solar radiation and which then exchanges its heat with the working fluid via some form of thermodynamic transfer.

The indirect solar receivers have been proven to be more robust than direct solar receivers because they require no transparent material through which the solar radiation must pass in order to reach the working fluid. Such transparent material may take the form of a quartz window or similar, which is capable of withstanding high temperatures but which is nonetheless relatively fragile to environmental factors such as dust and debris, with small cracks formed thereby propagating through the window as the temperature thereof rises and thereby leading to a failure of the entire solar receiver system. In contrast, an indirect solar receiver system is advantageous because it avoids any need for these relatively fragile elements of the system, albeit at the expense of reduced rate of transfer of energy from the solar radiation to the working fluid.

Once the working fluid has been suitably heated it may then be passed through some form of heat exchanger or combustion system to further increase the temperature of the working fluid for use with an electricity generation system such as a gas turbine linked to an electrical generator The efficiency of the system is a function of the amount of solar radiation entering the solar receiver that is effectively captured and transferred to the working fluid, followed by the efficiency of the transfer of that energy into useful work for driving the electrical generator. An issue that limits solar receivers from reaching maximum efficiency is that of re-radiation from the surface of the solar receiver back out into the atmosphere, which energy so re-radiated is lost for the purposes of power generation. It is therefore advantageous to provide a system that limits as far as possible a degree of re-radiation. A further factor in maximising the efficiency of a solar receiver is to limit the loss of thermal energy from the working fluid into its surroundings before reaching the power generation sub-system. Where the working fluid is pressurised, it is necessary to provide a pressure-tight seal around the channel through which the working fluid flows, and this pressure tight seal is difficult to create in the face of the significant temperature ranges experienced by the receiver components. Damage to the seal will lead to unwanted venting of the working fluid, which may cause damage to the solar receiver as a whole and will, at the very least, reduce the efficiency of the heat transfer process.

Another issue affecting efficient operation of solar receivers in the context of a complete power generation plant is pressure losses in the working fluid as it passes through the solar receiver. Such pressure losses translate into reduced overall efficiency at the plant level. Technical advances in reduction of pressure losses are therefore required.

The present disclosure is aimed at mitigating these issues to provide an efficient solar receiver system.

SUMMARY

A first aspect of the present disclosure provides a solar receiver having a radiation capturing element with a radiation receiving aperture, and a flow channel formed about the radiation capturing element, through which channel a working fluid flows in use such that thermal energy of the radiation capturing element is absorbed by the working fluid, the flow channel being shaped to present a uniform cross sectional area to the flow of working fluid between an inlet of the flow channel and an outlet therefrom.

Preferably, the thickness of the channel, perpendicular to an outer surface of the radiation capturing element, is varied as necessary to provide the uniform cross sectional area.

Preferably, the solar receiver includes an outlet duct for the working fluid, the outlet duct presenting the same cross sectional area to the flow of working fluid therethrough as the flow channel.

Preferably, the channel is filled with a porous material through which the working fluid flows, which porous material contacts the radiation capturing element, and wherein the working fluid absorbs at least a portion of the aforesaid thermal energy via the porous material. Advantageously, the porous material is reticulated porous ceramic foam, for which a suitable material is silicon carbide Preferably, an inlet to the flow channel is arranged to impinge the working fluid on the periphery of a front portion of the radiation capturing element proximate the radiation receiving aperture, whereby impingement cooling of the periphery of the front portion of the radiation capturing element by the working fluid reduces re-radiation of captured energy out through the aperture.

Preferably, the radiation capturing element comprises a cylindrical cavity whose end opposite the radiation receiving aperture is outwardly domed, the channel being formed around the dome. To achieve the required constant cross-sectional area of the flow channel around the dome, the thickness of the channel relative to the radius of the dome is a function of the radial angle relative to the longitudinal axis of the cavity.

In a further aspect, the solar receiver comprises a housing for the radiation capturing element, the radiation capturing element having an outwardly extending flange for securing the element to a part of the housing in a pressure tight manner.

The outwardly extending flange may be secured to the housing part by a clamp, and to facilitate the pressure tight seal a gasket may be provided between one or both of: a) the flange and the housing; and b) the flange and the clamp.

Preferably, a flow path for the working fluid is arranged to impinge the working fluid on the periphery of the outwardly extending flange to cool it.

Preferably, the flow path directs the working fluid to create an essentially uniform peripheral cooling effect on the front portion of the radiation capturing element, thereby to relieve stresses associated with thermal gradients.

The working fluid may be air or helium.

In a further aspect, the present disclosure provides a power generation system comprising at least one solar receiver as described above, wherein the or each outlet from the flow channel around the radiation capturing element is coupled to a subsequent power generating plant component, such as a gas turbine. Alternatively, the subsequent power generating plant component may be a combustor for further heating of the working fluid before the working fluid is passed to a gas turbine.

It should be understood that to obtain high power outputs from a solar powered power generation plant, several individual solar receivers may be arranged to feed their working fluid outputs in parallel to a subsequent power generating plant component.

BRIEF DESCRIPTION OF THE DRAWINGS

Exemplary embodiments will now be described with reference to the accompanying drawings, in which.

DETAILED DESCRIPTION OF EXEMPLARY EMBODIMENTS

Detailed descriptions of specific embodiments of solar receivers are disclosed herein. It will be understood that the disclosed embodiments are merely examples of the way in which certain aspects of the disclosure can be implemented and do not represent an exhaustive list of all of the ways in which the solar receivers may be embodied. Indeed, it will be understood that the solar receivers described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the disclosure.

Figures 1A, 1B:
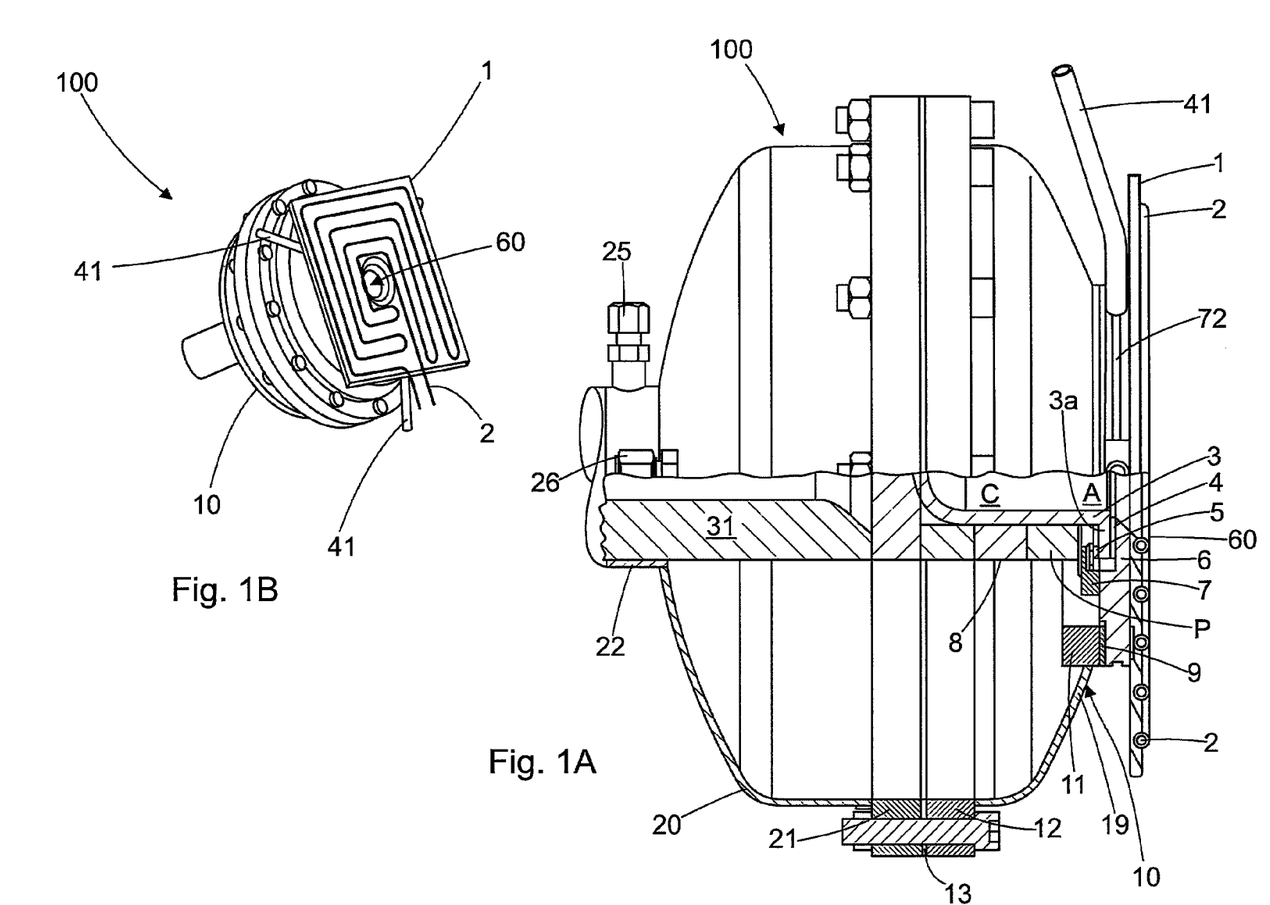
FIG. 1A is a side view, partially cut away, of selected elements of a solar receiver according to a first aspect of this disclosure.
FIG. 1B is a pictorial perspective view of the solar receiver of FIG. 1 on a reduced scale
Figure 4:
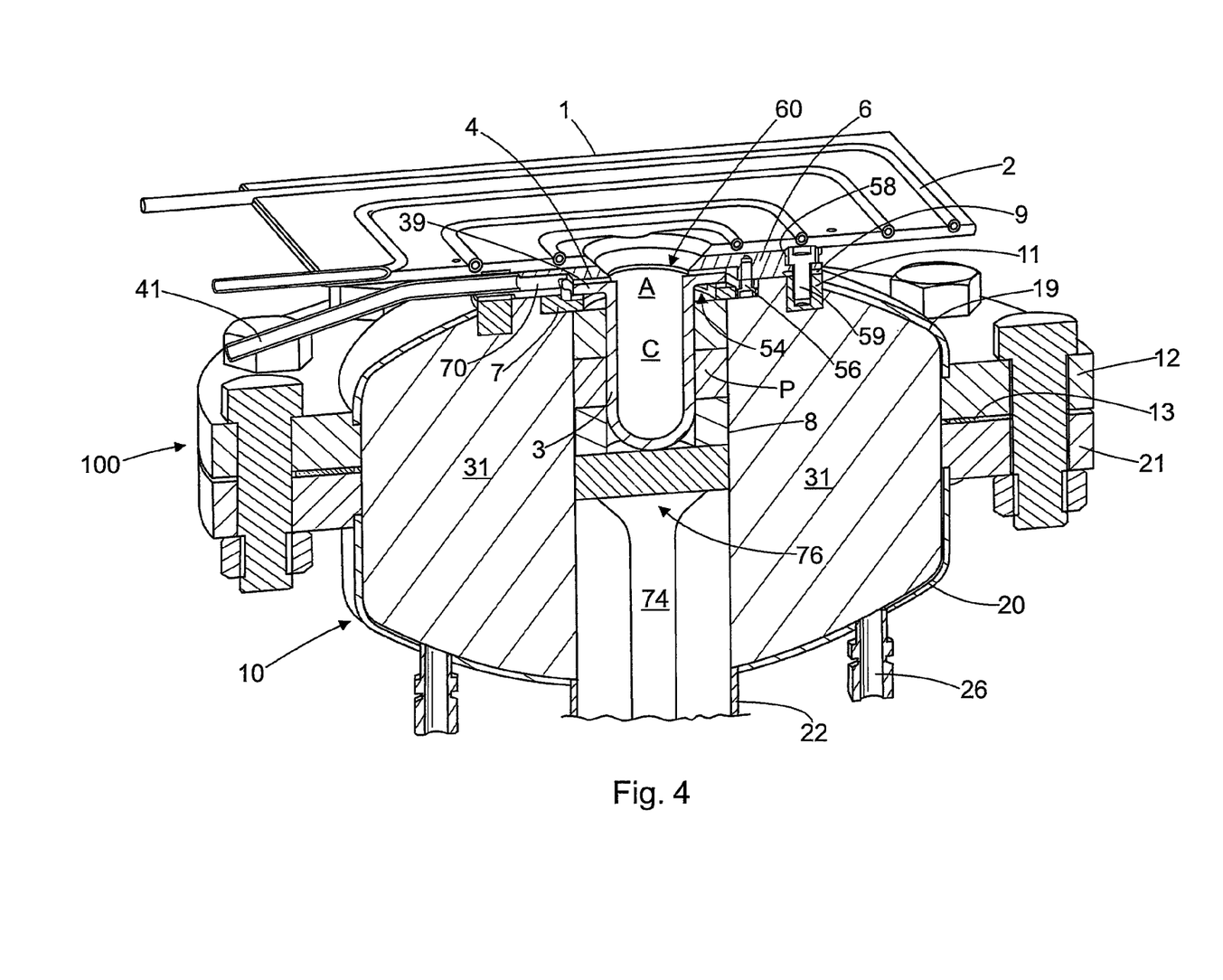
FIG. 4 is a perspective view of an axial cross section of the solar receiver of FIG. 1.

With reference to FIG. 1 and FIG. 4, an aspect of the present disclosure relates to an indirect solar receiver 100 comprising a hollow radiation capturing element 3 forming the wall of a cavity C into which solar radiation is received through a radiation entry aperture A. The radiation capturing element 3 is configured to exchange heat that has been generated in the walls of the capturing element 3 by the solar radiation, with a pressurised working fluid, such as air or helium, that is passed through a channel 8 formed around an outer surface of the radiation capturing element 3 and filled with a porous heat exchanging material P, as described below. The working fluid is pumped into the channel proximate the radiation entry aperture A, and flows along the exterior length of the element 3, from which it absorbs at least a portion of the thermal energy thereof, before flowing to an outlet of the solar receiver 100 and on to a power generation system.

In use, the solar receiver 100 receives solar radiation that has been reflected from an array of automatically guided mirrors that keep the reflected radiation concentrated on the solar receiver. In order to increase the radiation concentration factor, therefore the heat flux entering the radiation capturing element 3, and thus thermal efficiency, a secondary concentrator such as a compound parabolic concentrator, termed a CPC, is located in front of the radiation capturing element. Hence, although it appears in FIGS. 1 to 4 that the diameter of radiation receiving aperture A is the same as the diameter of the cavity C, during operation of the solar receiver the diameter $D_{ap}$ of aperture A will be smaller than the diameter $D_{CAV}$ of cavity C, because it will be defined by the exit aperture of the CPC located directly in front of the capturing element 3, as illustrated diagramatically in FIG. 5 and as further described below. CPCs require a highly reflective surface and typically operate at temperatures of 100° C. and below. Water cooling is preferably employed to maintain the temperature within this nominal range. After concentration by the CPC, solar flux typically of up to 5000 kW/m² enters the cavity 3.

The shape of the cavity C is designed to minimize the amount of solar energy that is lost by re-radiation from the inner surfaces of the cavity through the radiation entry aperture A, as restricted by the CPC. The cavity C preferably is formed as a cylinder that is closed at its rear end and has the radiation entry aperture A at its front end, front and rear being defined by reference to the general direction in which solar radiation enters the cavity. The closed end of the cavity C is domed in shape, i.e., convex in the rearward direction, preferably hemispherical, such that the cavity provides a continuous internal surface extending from the radiation entry aperture A. The cylindrical form is advantageous in that it aids even absorption of the solar radiation around about any given annular portion of the radiation capturing element 3. The cylindrical form is further advantageous in that it helps to minimize tensile stresses due to the pressure load. Similarly, the domed end of the cavity C ensures, as far as possible, even distribution of thermal energy about any given annular portion of the radiation capturing element 3. The element 3 is preferably formed of a non-porous material capable of withstanding suitably high temperatures of, for example, over 1000° C. Advantageously, SSiC (sintered silicon carbide) is used, as it capable of withstanding a high degree of thermal stresses, and this aids durability of the cavity when in use, as described below. If made of SSiC, the element 3 may be moulded in one piece, e.g., by hot-pressing and sintering of SiC powder, or it may alternatively be formed from two or more components. In particular, if the radiation capturing element is made from SiSiC (silicon infiltrated silicon carbide), it is convenient to construct the element by fusing together two components, consisting of a cylindrical main body and the domed end. The walls of element 3 preferably have a uniform annular thickness in the range of about 3 mm to about 15 mm, depending on operating pressure and material properties. In principle, thinner walls give better efficiency and reduced thermal stresses, but the choice of thickness is based on a trade off between structural robustness of the element 3 and speed of transfer of thermal energy therethrough. For example, using SSiC, a thickness of about 5-7 mm is estimated to be sufficient to contain a pressure of 10 MPa.

The diameter of aperture A, as effectively restricted by the exit aperture of the CPC, is chosen to be sufficiently large to receive a desired quantity of solar radiation into the cavity C between the cylindrical walls of the capturing element 3, but sufficiently small to minimise re-radiation of captured radiation back out of aperture A. However, a small diameter of aperture A may lead to additional difficulties in focusing the solar radiation into the cavity C, even while benefitting from reduced re-radiation of solar radiation back out of the aperture A. In general, the dimensions associated with the radiation capturing element 3 should be chosen to maximize the amount of radiation entering the cavity C, while minimizing the amount of solar energy lost from the cavity and maximizing heat transfer efficiency from the capturing element 3 to the working fluid in flow channel 8. For example, our copending patent application reference T10/035-0_GB of even date with the present patent application, discusses optimisation of aperture and cavity dimension in terms of ratios. Suitable cavity dimensions in absolute terms depend strongly on the power level of the receiver, but maximum cavity diameter is restricted by the manufacturing process of the element 3 and the associated loss in robustness for larger dimensions. For example, for a 100 kW receiver the diameter of the cavity C may be about 300 mm, with a length of 500 mm.

The thermal efficiency of the solar receiver is a function of the following parameters:
- the aperture diameter, $D_{ap}$, of the capturing element;
- the internal diameter, $D_{CAV}$ of the capturing element;
- the input energy entering the capturing element, $q_{incident}$;
- the opening angle, $\Theta$ (i.e., the angle at which the radiation enters the capturing element from the CPC);
- the temperature $T_{inlet}$ of the working fluid at the inlet to the solar receiver; and
- the mass flow rate in of the working fluid through the solar receiver.

The thermal efficiency $\eta_{thermal}$ of the solar receiver can be expressed as the ratio of energy transferred into the working fluid to the energy of the incident solar radiation, as in the following equation:

$$\eta_{thermal} = \frac{\dot{m}(h_{outlet}(T_{outlet}) - h_{inlet}(T_{inlet}))}{q_{incident}}$$

where, $h_{outlet}$ and $h_{inlet}$ are the enthalpies of the working fluid at the outlet and at the inlet, respectively, and $T_{outlet}$ is the outlet temperature of the working fluid after it has absorbed thermal energy from the radiation capturing element 3.

Figure 5:
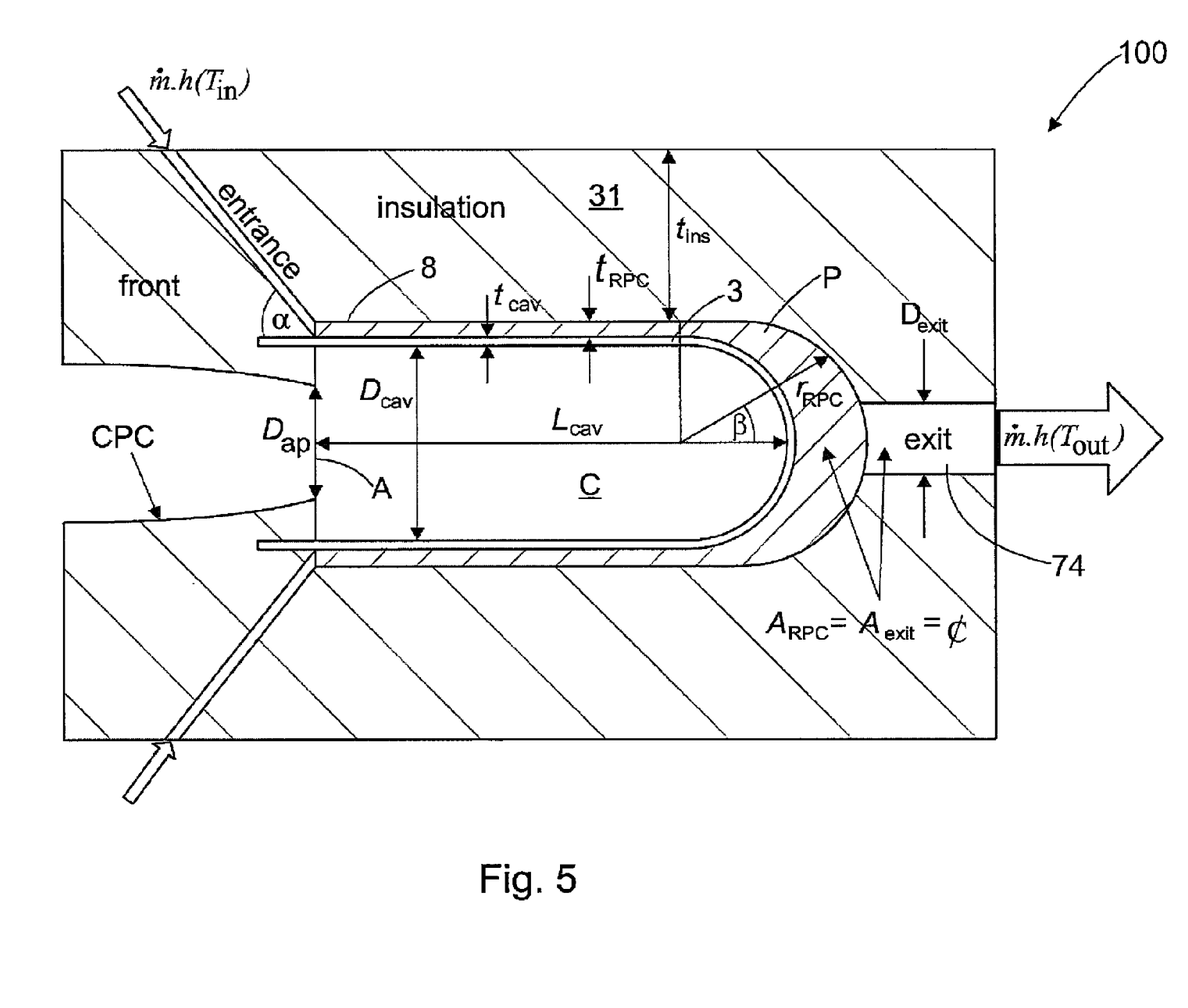
FIG. 5 is a schematic view of a solar receiver according to an aspect of the present invention.

Turning now to FIG. 5 and the aspect of optimising the design of flow channel 8 that surrounds the exterior surface of the radiation capturing element 3, it has already been mentioned that the flow channel is filled with a porous heat exchanging material P. This is preferably in the form of a reticulated porous ceramic (RPC) foam, which allows passage of the working fluid therethrough and which provides a means of heat exchange between the exterior surface of the cavity 3 and the working fluid. It is envisaged that the working fluid may, for example, be air, which will pass readily through the pores of the material P. In FIG. 4, the porous material P is shown as comprising a stack of annular blocks with an internal diameter matched to the outer diameter of the cylindrical radiation capturing element, and a disc-shaped block positioned at the downstream end of the channel 8 and abutting the domed end of the radiation capturing element 3. Although easy to manufacture, such a design is not optimised to minimise pressure losses in the working fluid passing through flow channel 8.

The RPC porous material P is effective to augment conductive, radiative and convective heat transfer from the radiation capturing element 3 to the working fluid at the expense of a pressure drop due to its flow resistance. Optimisation of the shape of the flow channel 8 in accordance with the present disclosure minimises the pressure drop in the working fluid. To understand how such optimisation may be achieved, and turning now to FIG. 5, first consider a notional design in which the porous material P, which fills the flow channel 8, and therefore defines its dimensions, is of a constant thickness $t_{RPC}$ around the radiation capturing element 3, including around its domed (hemispherical) end. At the entrance to the flow channel 8 and along the cylindrical extent of the capturing element 3, the working fluid would experience a maximum cross-sectional (annular) area of the flow channel, but at the domed end of the capturing element 3, the working fluid would experience a reducing cross-sectional area as it approached the outlet duct 74 of the solar receiver 100. This would be true even if the cross-sectional area of the outlet duct were matched to the maximum cross-sectional area of the flow channel, because the diameter of the outlet duct 74 needed to achieve that cross-sectional area would be less than the diameter of the cylindrical part of the capturing element. Such a reduction in cross-sectional area would result in high local velocities in the flow of the working fluid and therefore a high pressure drop, resulting in high parasitic losses. This translates into reduced overall efficiency at the plant level, i.e., considering the solar receiver as part of a power generation plant including a compressor for pumping the working fluid through the solar receiver and a gas turbine for extracting work from the heated working fluid.

To overcome this problem, it is proposed that the flow channel 8 should preferably be shaped such that its local cross sectional area, $A_{RPC}$, from the perspective of the working fluid flowing through the channel 8, is substantially constant over the length of the flow channel 8 as the fluid flows past the capturing element 3 and into the outlet duct 74. To achieve this, it is proposed to vary the thickness $t_{RPC}$ of the flow channel as necessary to provide the uniform cross sectional area, the thickness $t_{RPC}$ being measured perpendicular to the outer surface of the radiation capturing element 3.

This constant area $A_{RPC}$ can be achieved in accordance with the following equation by appropriate variation of the outer radius of the flow channel, $r_{RPC}$, as a function of the diameter of the cavity, $D_{CAV}$; thickness of the cavity wall, $t_{CAV}$; thickness of the channel, $t_{RPC}$; and, radial angle relative to a longitudinal central axis of the cavity, β as indicated in FIG. 5.

$$r_{RPC} = \left[ \frac{(D_{CAV}/2 + t_{CAV} + t_{RPC})^2 - (D_{CAV}/2 + t_{cav})^2}{\sin\beta} + (D_{CAV}/2 + t_{CAV})^2 \right]^{0.5}$$

The above equation assumes the cavity 3 terminates in a perfectly hemispherical portion.

Furthermore, the outlet diameter, $D_{exit}$, should be chosen to ensure that the constant cross-sectional area $A_{RPC}$ of the flow channel 8 at its entrance is equal to the cross-sectional area $A_{exit}$ of the outlet duct 74. This can be achieved using the following equation.

$$A_{exit} = \pi(D_{exit}/2)^2 =$$
$$A_{channel} = \pi(D_{CAV}/2 + t_{CAV} + t_{channel})^2 - \pi(D_{CAV}/2 + t_{CAV})^2$$

The utility of the above proposal will now be illustrated by examples, in which the solar receiver is exposed to 100 kW of concentrated solar radiation, resulting in an average radiation power concentration of 2000 kW/m², which enters the cavity and is uniformly distributed into it with an opening angle of 60° (the opening angle is the angle over which the radiation enters the capturing element from the CPC). Pressurized air enters the channel 8 of the solar receiver 100 at 200° C., a pressure of 10 bar, and with a mass flow rate of 75 g/s at an inlet angle α of 0° (i.e., the air enters the flow channel 8 at right angles to the surface of the radiation capturing element 3). The reflective surface of the CPC is preferably water cooled to 300 K. The geometrical dimensions of the solar receiver 100 are:

diameter of the aperture A, $D_{ap}$=0.25 m;

diameter of the cavity C, $D_{CAV}$=0.5 m;

length of the cavity C, $L_{CAV}$=0.5 m;

thickness of the insulation around the flow channel 8, $t_{INS}$=100 mm;

thickness of the cavity wall, $t_{CAV}$=20 mm; and, thickness of the flow channel 8, $t_{RPC}$=10 mm.

The table below gives data in a first example ("Case 1") in which the channel 8 is formed with contant thickness, $t_{RPC}$ of 10 mm. The table also gives data concerning a second example ("Case 2") in which the channel 8 is formed to provide a constant channel cross sectional area, $A_{RPC}$. In Case 2 the maximum local velocity and total pressure drop of the working fluid at the outlet are reduced by a factor of about 4 compared to Case 1. Outlet temperature is marginally reduced by about 0.3%, i.e. it is essentially unaffected.

TABLE 1

Main results for case 1 and 2.

| | Case 1 (constant $t_{RPC}$) | Case 2 (constant $A_{RPC}$) |
|---|---|---|
| Max. velocity [m/s]: | 14 | 3.5 |
| Total pressure drop [mbar]: | 76.5 | 19.9 |
| Air outlet temperature [° C.]: | 1110 | 1107 |

The following benefits accrue by designing the flow channel 8 to have a constant area $A_{RPC}$, thereby very significantly reducing working fluid flow velocity and pressure drop in the solar receiver:

Low maximum flow velocity through the RPC material P in the flow channel 8 and the transition to the outlet duct 74 reduces turbulent flow, resulting in less vibration of the solar receiver during operation.

Low pressure drop through the RPC material P and associated low parasitic losses result in less work being required to pump the working fluid through the solar receiver and onward to the rest of the power generation plant.

The low maximum flow velocity through the RPC material P is not believed to adversely affect thermal efficiency of the solar receiver to any significant extent, hence the lower pumping workload translates into enhanced overall efficiency at the plant level.

As shown best in FIG. 4, and as shown diagramatically in FIG. 5, a volume of insulation material 31 is disposed around the channel 8 of porous heat exchanging material P. This insulator advantageously prevents, as far as possible, heat losses from the channel 8 and should comprise a material with low conductivity and low permeability. Preferably, as best shown in FIG. 4, the insulating material fills the remaining volume between the channel 8 and an outer housing 10 of the solar receiver 100.

In one embodiment, the insulating material is made from Al2O3-SiO2 (aluminosilicate) fibers. This is a highly porous material with porosities of 80-95% (porosity is defined as (void volume)/(total volume)). The fiber diameter is very small, in the order of 1-10 micrometers, which leads to a tortuous path for the working fluid, resulting in a low permeability in the order of 10^(-10) m^2. Since the permeability of insulating material is orders of magnitude lower than the permeability of reticulated porous ceramic foam (~10^(-7)m^2) the working fluid is mainly (>99%) flowing through the porous ceramic foam and not into the insulating material, as the resistance across the porous ceramic foam is lower compared to the resistance across the insulation.

To further increase the ratio of permeability between the insulation and the reticulated porous ceramic foam, and hence prevent the working fluid from entering the insulation it is possible to make the insulation of a dense material, e.g. solid Al2O3 (alumina) at the expense of higher thermal conductivity. To have both advantages, high permeability ratio and low thermal conductivity, it is further possible to use fibrous insulation with low thermal conductivity and add a layer of dense insulation with low permeability to separate the fibrous insulation from the gas flow. The layer can be a layer of ceramic cement based on high temperature ceramic materials (e.g., Al$_2$O$_3$, SiO$_2$, ZrO$_2$, etc.) or directly by a thin walled structure of ceramic material made from e.g., Al$_2$O$_3$ or ZrO$_2$.

The housing 10 further comprises a circular aperture plate 6 and, if necessary, a fascia plate 1, both formed of steel, which define an aperture 60 that converges from a larger diameter in the outer surface of the fascia plate (if present) to a smaller diameter in the surface of the aperture plate 6 adjacent the aperture A of element 3. In use, the aperture plate 6, or, if present, the fascia plate 1, interfaces with the CPC illustrated schematically in FIG. 5, which collects radiation from the solar mirror array and directs it into the cavity C through aperture 60. The aperture 60 is aligned and sized to allow registry with the front opening of the cavity C. A pressure-tight gasket 4 seals the joint between aperture plate 6 and an out-turned flange 3a of the radiation capturing element 3.

The fascia plate 1 is only necessary if the solar radiation is not perfectly focussed into the CPC. Hence, if present, it only serves as a shield for radiation spillage, i.e., radiation from the solar mirror array that is not perfectly focussed into the mouth of the CPC. For this purpose the fascia plate 1 is cooled by coolant circuits 2 embedded in its front surface, which coolant circuits 2 comprise small bore pipes formed from a thermally conductive material such as copper. A coolant fluid, such as water, is pumped through the coolant circuits 2 to transfer away any heat that builds up in the fascia plate 1 and the underlying aperture plate 6. It is advantageous to transfer this heat away from the aperture plate 6 of the housing to avoid thermal warping thereof.

To facilitate manufacture, and as best seen in FIG. 4, the housing 10 of the solar receiver 100 comprises two principle parts, a front housing component 19 and a rear housing component 20, which are bolted together at their annular bolting flanges 12 and 21, respectively, with a pressure-tight annular sealing gasket 13 between them. Housing components 19 and 20 define between them an interior volume that is sized and configured to receive the radiation capturing element 3, it's surrounding channel 8, a working fluid exit duct 74, and the volume of insulation 31 to minimize thermal losses from the channel 8 and the duct 74.

In the exemplary configuration illustrated in FIGS. 1A and 4, a funnel-shaped duct portion 76 receives hot working fluid from the RPC foam P in the downstream end of the channel 8 and outlet duct 74 then conveys it to plant in which its energy can be utilised, such as a gas turbine. An upstream part of duct 74 is accommodated within housing component 20 and a downstream part of duct 74 is accommodated within a cylindrical extension 22 of housing component 20. Duct 74 and extension 22 preferably terminate in an outlet fitting (not shown) for connection to an inlet of a power producing system, such as a gas turbine. As previously described in relation to FIG. 5, the transition of the flow channel 8 into the outlet duct 74 should preferably be optimised by maintaining a constant flow area to minimise pressure losses in the flow of working fluid therethrough.

It is contemplated that for convenience of manufacture the housing components 19 and 20 and the extension 22 are each formed from sheet steel. The extension 22 is preferably secured to the housing portion 20 by welding, though any other suitably robust means of securement that creates a seal between the components would be suitable.

The solar receiver 100 further comprises a plurality of access points through which it is possible to insert sensors for monitoring the status of the solar receiver 100. For example, a first access point 25 may provides means to insert a thermocouple into the housing extension 22, for measuring the outlet temperature of the working fluid, whereas a second access point 26 may allow measurement of the external temperature of the radiation capturing element 3.

Working fluid for passage through flow channel 8 may be directed into the solar receiver 100 through one or more, for example three, flow channels 70 (see FIG. 4) provided in the disc-shaped aperture plate 6, each being fed by an inlet tube 41 connectable to a pressurised source of the working fluid. Preferably, each inlet tube 41 is directed radially into, and evenly spaced around, an annular external recess 72 in the edge of the aperture plate 6 of the solar receiver 100. The source of pressurised working fluid may take the form of, for example, a pumping system or a pressurised reservoir. The inlet tubes 41 may be secured to the aperture plate 6 by welding or brazing, for example, to provide for a good pressure tight seal.

Figure 2A:
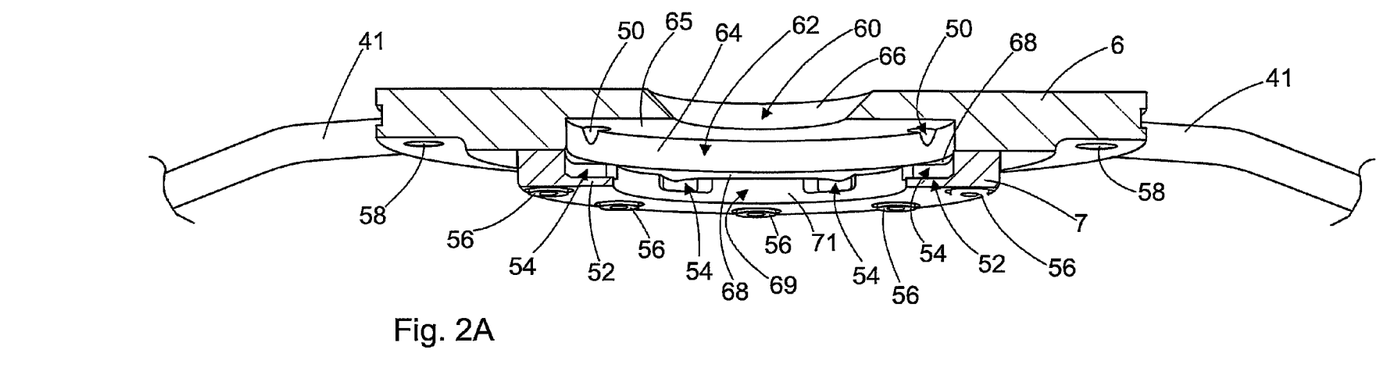
FIG. 2A is a perspective cut away view of selected elements at the front of the solar receiver of FIG. 1.
Figure 2B:
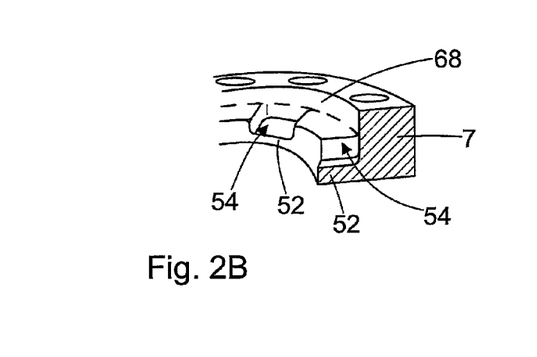
FIG. 2B is fragmentary view of a component in FIG. 2A, showing it from a different angle.
Figure 3:
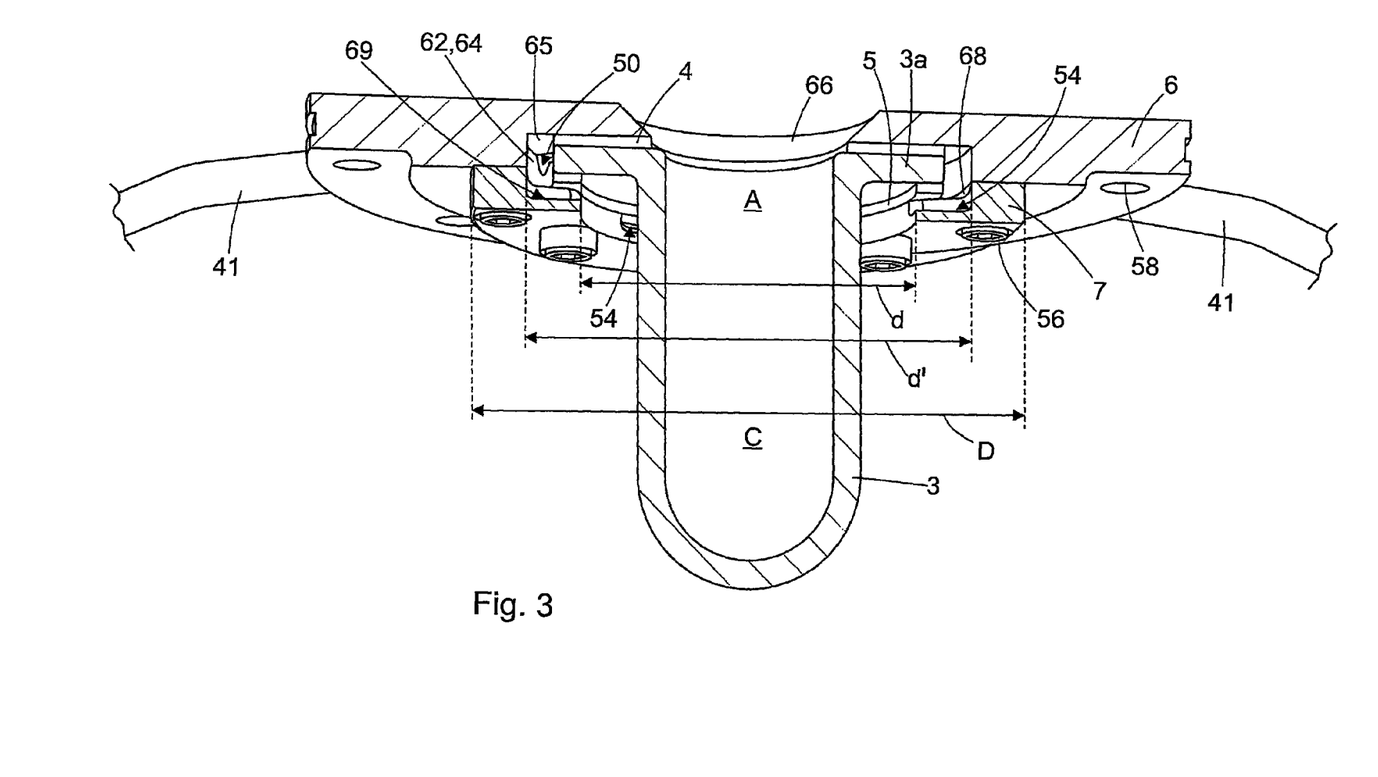
FIG. 3 is a perspective cut away view of selected elements of the solar receiver of FIG. 1.

As best shown in cross section in FIG. 4, each flow channel 70 is formed by a bore that extends substantially radially through the aperture plate 6 and terminates in an aperture 50, best shown in FIGS. 2 and 3. Each aperture 50 opens into an inner circular recess of the aperture plate 6, which recess forms a chamber 62 defined between aperture plate 6, a clamping ring 7 and the radiation capturing element 3, as described in more detail below.

In the embodiment illustrated, each aperture 50 is defined in the corner of the recess formed by the intersection of the cylindrical side wall 64 of the recess and its annular end surface 65. In this manner, the portion of the aperture 50 defined in the wall 64, together with the portion of the aperture 50 defined in the end surface 65, provide a suitably large cross sectional area to facilitate sufficient flow of working fluid therethrough.

The aperture 60 is formed centrally in the aperture plate 6 and has a bevelled edge 66 angled such that the aperture 60 narrows as it approaches the aperture A of cavity C. At its smallest diameter, the aperture 60 is sized to register with an aperture formed in the gasket 4, sandwiched between the aperture plate 6 and the out-turned flange 3a of the radiation capturing element 3, see FIG. 3.

A plurality of (e.g., 12) blind threaded bores are equally spaced around the aperture plate 6 at a fixed radial offset from the interior wall 64 to receive set-screws 56 or the like for securing the clamp 7 to the rear of the aperture plate 6, the clamp 7 being provided with corresponding through bores to receive the shanks of the screws 56. The locations of these bores are chosen so as to avoid penetrating the flow channels 70 that pass radially through the aperture plate 6.

As illustrated particularly in FIGS. 2A, 2B and 3, the clamp 7 is basically an annulus with an outside diameter D and an inside bore 71 of diameter d. However, it has been modified by (a) machining a short countersunk bore 68 of diameter $d^1$ in the front side of the clamp 7, $d^1$ being larger than diameter d, to create an inwardly extending flange 69; and (b) machining a plurality of (e.g., six) equally spaced recesses or chambers 54 into the front face of the flange 69. The chambers 54 are generally rectangular or square when seen in plan view and at their radially inner sides are open to the inside bore 71 of the clamp 7. As shown in FIGS. 3 and 4, when clamp 7 is secured to the aperture plate 6, the chambers 54 communicate between the chamber 62 and the flow channel 8 surrounding the radiation capturing element 3, and flange 69 of clamp 7 clamps the out-turned flange 3a of the radiation capturing element 3 against the rear face of the aperture plate, with apertures A and 60 in registration with each other. The arrangement of the chambers 54 is such that each aperture 50 defined in the aperture plate 6 is equidistant from the adjacent chambers 54. This equidistant arrangement is advantageous in that it enables the working fluid flows to be shared equally between chambers 54. In the illustrated embodiment, for example, the aperture plate 6 of the housing comprises three apertures 50, and the clamp 7 provides six chambers 54, each aperture being equidistance from its two adjacent chambers 54.

The clamp 7 is advantageously formed of a material capable of withstanding high temperatures. One such suitable material would be Inconel®: an austenitic nickel-chromium-based superalloy. Inconel alloys are particularly useful in high temperature applications as it has a melting point of over 1300° C.

The gasket 4 is provided to ensure a pressure tight seal between the front surface of flange 3a of element 3 and the rear surface of the aperture plate 6. The gasket 4 is preferably formed of graphite, because of its high temperature resistance and because its high compressibility enables it to seal at high pressures. Another gasket 5 is disposed between a peripheral portion of the flange 3a of the element 3 and the front face of the flange 69 of clamp 7. This gasket 5 has the same external diameter as gasket 4, but a larger internal diameter. In the embodiment shown, gasket 5 extends across portions of the chambers 54 formed in flange 69 of clamp 7, but without blocking working fluid flow therethrough because the external diameter of gasket 5 is less than the diameter of bore 68 of clamp 7.

As described in our copending patent application reference T10/035-0_GB of even date with the present patent application, thermal efficiency of the radiation capturing element is optimised when the ratio of the diameter of the aperture A of the capturing element to the diameter of the cylindrical walls of the capturing element lies in the range of about 0.3 to about 0.7, preferably about 0.4 to about 0.65, or roughly 0.5. These ratios can be achieved by letting the CPC (FIG. 5) define the radiation receiving aperture A of the capturing element. As $D_{ap}/D_{CAV}$ decreases from a value of 1, the intensity of radiation is reduced on the wall of the capturing element near the aperture A of the radiation capturing element 3, thereby decreasing thermal stresses upon the contacting portions of the radiation capturing element 3 and the aperture plate 6 of the housing, so aiding maintenance of a pressure tight seal therebetween.

The completed assembly of the aperture plate 6, gasket 4, radiation capturing element 3, gasket 5 and clamp 7 is best shown in FIG. 3. This radiation capture assembly is then united with the housing 10 and its associated components, so that the aperture plate 6 becomes part of the housing. This is accomplished by inserting the radiation capturing element 3 into a complementarily sized bore in the porous material P forming channel 8, as shown in FIG. 4. Clamp 7 also fits within a recess formed in the front surface of the insulation material 31. Hence, the radiation capture assembly of FIG. 3 completes the front of the housing assembly. To secure the aperture plate 6 to the front housing part 19, setscrews 59 or the like pass through a set (e.g., twelve) of equi-spaced bores 58 formed in a peripheral flange of the aperture plate and are screwed into corresponding threaded blind bores in a flange 11 of the front housing component 19. A further graphite gasket 9 is sandwiched between the aperture plate 6 and the flange 11.

FIGS. 3 and 4 show the flow path of the pressurised working fluid from the inlet tubes 41 to the outlet duct 74, via the bores 70 in aperture plate 6, chambers 62 and 54, and the porous material P in the channel 8. The working fluid increases in temperature through transfer of heat from the structure of the porous material P. This heat transfer cools the porous material, which in turn absorbs heat from the contacting surface of the heat capturing element 3. The cooling effect on the element 3 is greatest proximate the radiation receiving aperture A, where the temperature difference between the working fluid and the element 3 is greatest. The working fluid may, for example, be pressurised to about 10 MPa, which is a moderate pressure useful for driving a simple gas turbine. At this and higher pressures and temperatures, it becomes difficult to maintain pressure tight seals between element 3 and the adjacent structure of the solar receiver. Thus, the clamping of flange 3a of element 3 using graphite gaskets in the way disclosed above is advantageous in that it allows for longitudinal thermal expansion of the element 3 during use and also allows limited radial thermal expansion of flange 3a without compromising the seals achieved by gaskets 4 and 5. Limited thermal spreading of flange 3a as it heats up may be facilitated by applying a known high temperature anti-stick coating to the graphite gaskets to lower their coefficient of friction. However, it is also important to note that the impingement of the working fluid on the periphery of flange 3a, its passage through multiple chambers 54 and under the rear surface of flange 3a, and its subsequent impingement on the front portion of the exterior surface of the radiation capturing element 3, creates a substantially uniform impingement cooling effect on the periphery of flange 3a and on the periphery of the front portion of element 3, thereby significantly reducing the temperature of the front section of the element 3. This not only reduces thermal and mechanical stresses in the flange 3a, but also minimises radiation losses through aperture A.

It is envisaged that the working fluid, after being heated by its passage through the porous material in the channel 8, and exiting the solar receiver 100 through outlet duct 74, will go directly to a power generation system. Hence, it may be fed directly into a gas turbine, or alternatively it may be fed into a combustion system for further heating before being passed to the gas turbine. After the gas turbine it may undergo a heat exchange with a second working fluid, preferably water to create steam for subsequent use in a power generation subsystem such as a steam turbine. Both power generation systems then operate in concert to produce power. Having exchanged its heat with the second working fluid, the first working fluid may, at least in the case of air, be vented to the atmosphere. Alternatively, if a more expensive gas, such as helium, is used, it may be passed back, via a pumping system, to the inlet tubes 41 of the solar receiver 100 for a further cycle of solar heating.

It can be appreciated that various changes may be made within the scope of the present disclosure, for example, the size and shape of the various elements of the solar receiver may be altered as required, and the entire solar receiver may be scaled up or down as required.

It is further contemplated that the radiation capturing element may be formed of a different material from SiC, such as a refractory alloy. This would offer increase structural strength, but at the cost of a lower heat conductivity and operating temperature, meaning that the solar receiver would have reduced efficiency compared to a cavity formed from SiC.

In an alternative embodiment, it is envisaged that the apertures 50 may be entirely formed in either the wall of bore 64 or its annular end surface 65 as required, through corresponding modification of the way in which the channels 70 penetrate the aperture plate 6, and, as necessary, alteration of the thickness of the aperture plate 6. At present, we prefer that the channels 70 are oriented substantially radially in the aperture plate 6. It is, however, contemplated that the orientation of the channels 70 and the chambers 54 may be altered such that they guide the flow in a way that produces a vortex-like flow around the front part of the radiation capturing element 3, thereby further increasing the cooling effect.

As previously mentioned, the fascia plate 1 may be omitted where there is reduced or no chance of radiation spillage. It is further contemplated that the aperture plate of the housing may be water-cooled and formed of alumina Although the above description has focused on the use of graphite gaskets, it would alternatively be possible to fabricate them from ceramic fibres (e.g., alumina $Al_2O_3$), or a nickel-based superalloy such as Inconel®.

It is further contemplated that the channel 8 of porous material P might be formed directly onto the external surface of the element 3, rather than formed separately and disposed in the insulating material 31 before the element 3 is then inserted therein.

Helium has been mentioned above as an alternative working fluid, because helium has a higher heat transfer coefficient than air at equal volume flow rates, which results in slightly higher thermal efficiencies for equal pressure drops.

It will be recognised that as used herein, references such as "end", "side", "inner", "outer", "front" and "rear" do not limit the respective features to such orientation, but merely serve to distinguish these features from one another.

The invention claimed is:

1. A solar receiver comprising:
    a radiation capturing element terminating in a hemispherical portion opposite a radiation receiving aperture; and
    a flow channel formed around the radiation capturing element, the flow channel shaped for a uniform cross sectional area from an inlet of the flow channel to an outlet duct thereof, through the flow channel a working fluid flows to absorb thermal energy of the radiation capturing element, wherein the flow channel is filled with a porous material through which the working fluid flows, which porous material contacts the radiation capturing element, and
    wherein the working fluid absorbs at least a portion of the aforesaid thermal energy via the porous material, and wherein the porous material comprises silicon carbide, and
    wherein a thickness of the flow channel is varied to provide the uniform cross sectional area throughout, wherein the thickness is measured perpendicular to an outer surface of the radiation capturing element.

2. The solar receiver according to claim 1, wherein the outlet duct is arranged at an angle with respect to an inlet duct, for a flow of working fluid into the flow channel from the inlet and out of the flow channel through the outlet duct, with the outlet duct shaped with a same cross sectional area for the flow of working fluid therethrough as that of the flow channel.

3. The solar receiver according to claim 1, wherein an inlet to the flow channel impinges the working fluid on a periphery of a front portion of the radiation capturing element at the radiation receiving aperture to cool the periphery of the front portion of the radiation capturing element with the working fluid to reduce re-radiation of captured energy out through the radiation receiving aperture.

4. The solar receiver according to claim 1, wherein the radiation capturing element comprises a cylindrical cavity with an outwardly domed end opposite the radiation receiving aperture, and the flow channel is formed around the outwardly domed end.

5. The solar receiver according to claim 1, wherein the radiation capturing element comprises a cylindrical cavity with an outwardly domed end forming the hemispherical portion opposite the radiation receiving aperture, and the flow channel is formed around the outwardly domed end, so that the thickness of the flow channel relative to a radius of the outwardly domed end of the cavity is a function of a radial angle relative to a longitudinal axis of the cavity.

6. The solar receiver according to claim 1, further comprising a housing for the radiation capturing element, and an outwardly extending flange on the radiation capturing element for securing the radiation capturing element to a part of the housing in a pressure tight seal.

7. The solar receiver according to claim 1, further comprising a housing for the radiation capturing element, and an outwardly extending flange on the radiation capturing element for securing the radiation capturing element with a clamp to a part of the housing in a pressure tight seal.

8. The solar receiver according to claim 1, further comprising a housing for the radiation capturing element, and an outwardly extending flange on the radiation capturing element for securing the radiation capturing element to a part of the housing in a pressure tight seal facilitated by a gasket arranged between one or both of: a) the flange and the housing; and b) the flange and a clamp.

9. A solar receiver according to claim 1, comprising in the inlet, a flow path for the working fluid arranged to impinge the working fluid on a periphery of an outwardly extending flange on the radiation capturing element to cool on the radiation capturing element.

10. The solar receiver according to claim 1, wherein in the inlet, a flow path directs the working fluid to create an essentially uniform peripheral cooling effect on a front portion of the radiation capturing element to relieve stresses associated with thermal gradients.

11. The solar receiver according to claim 1, wherein the working fluid is air or helium.

* * * * *